United States Patent
Linke et al.

(10) Patent No.: US 8,590,693 B2
(45) Date of Patent: Nov. 26, 2013

(54) METHOD AND APPARATUS FOR TRANSFERRING WORKPIECES

(75) Inventors: Michael Linke, Hamburg (DE); Michael Litzenberg, Geesthacht (DE); Frank Lewin, Tangstedt (DE); Carlo Striebel, Hamburg (DE); Rolf Baumgarte, Ahrensburg (DE)

(73) Assignee: KHS Corpoplast GmbH, Hamburg (DE)

( * ) Notice: Subject to any disclaimer, the term of this patent is extended or adjusted under 35 U.S.C. 154(b) by 0 days.

(21) Appl. No.: 13/139,490

(22) PCT Filed: Sep. 7, 2009

(86) PCT No.: PCT/DE2009/001266
§ 371 (c)(1),
(2), (4) Date: Oct. 18, 2011

(87) PCT Pub. No.: WO2010/066217
PCT Pub. Date: Jun. 17, 2010

(65) Prior Publication Data
US 2012/0024668 A1    Feb. 2, 2012

(30) Foreign Application Priority Data
Dec. 11, 2008 (DE) .......... 10 2008 062 315

(51) Int. Cl.
*B65G 47/04* (2006.01)
(52) U.S. Cl.
USPC .................... 198/468.5; 198/472.1

(58) Field of Classification Search
USPC ........ 198/468.5, 472.1; 294/116, 203; 901/31
See application file for complete search history.

(56) References Cited

U.S. PATENT DOCUMENTS

| | | | |
|---|---|---|---|
| 4,667,998 A | 5/1987 | Borcea et al. | |
| 6,386,609 B1 * | 5/2002 | Govzman | 294/207 |
| 6,626,476 B1 * | 9/2003 | Govzman et al. | 294/119.1 |
| 7,784,603 B2 * | 8/2010 | Burgmeier | 198/472.1 |
| 8,297,671 B2 * | 10/2012 | Knieling et al. | 294/90 |

FOREIGN PATENT DOCUMENTS

| | | |
|---|---|---|
| DE | 2352926 | 4/1975 |
| DE | 4212583 | 10/1993 |
| DE | 4340291 | 6/1995 |
| DE | 19906438 | 8/2000 |
| DE | 102006012020 X | 9/2007 |
| DE | 102006023531 X | 11/2007 |
| EP | 1970134 X | 9/2008 |
| SU | 1007968 X | 3/1983 |

\* cited by examiner

*Primary Examiner* — James R Bidwell
(74) *Attorney, Agent, or Firm* — Lucas & Mercanti, LLP; Klaus P. Stoffel

(57) ABSTRACT

A method and apparatus are used to transfer workpieces, in particular preforms or bottles. The workpiece is subjected to pressure by a gripper-like holding device, which has at least one gripper arm arranged pivotably relative to a gripper carrier. The gripper arm is pivoted in order to perform gripping and releasing movements. The pivoting motion of the gripper arm is controlled by at least one magnet, particularly a permanent magnet.

17 Claims, 8 Drawing Sheets

METHOD AND APPARATUS FOR TRANSFERRING WORKPIECES

The present application is a 371 of International application PCT/DE2009/001266, filed Sep. 7, 2009, which claims priority of DE 10 2008 062 315.6, filed Dec. 11, 2008, the priority of these applications is herby claimed and these applications are incorporated herein by reference.

BACKGROUND OF THE INVENTION

The invention pertains to a method for transferring workpieces in which the workpiece is handled by a gripper-like holding device comprising at least one gripper arm mounted with freedom to pivot relative to a gripper carrier and in which the gripper arm is pivoted to perform gripping and release movements.

The invention also pertains to an apparatus for transferring workpieces comprising at least one gripper-like holding device for handling the workpiece, wherein the holding device is provided with at least one gripper arm mounted with freedom to pivot relative to a gripper carrier, the gripper arm comprising a first pivoted position for holding the workpiece and a second pivoted position for releasing the workpiece.

These types of methods and apparatuses can be used in conjunction with, for example, the production of containers by the blow-molding process. In these types of applications, the apparatus is installed in a blow-molding machine. The workpiece in question, which is handled by the holding device, can be a preform, a blow-molded container, or a support element which itself holds the preform or the blow-molded container.

In the molding of containers by the action of blown air, preforms of a thermoplastic material such as PET (polyethylene terephthalate) are sent to various processing stations within a blow-molding machine. A blow-molding machine of this type usually comprises a heating device and a blowing device, in which the previously tempered preform is expanded to form the container by a process of biaxial orientation. The expansion is produced by compressed air, which is introduced into the preform to be expanded. The course of the technical processes which take place during this type of preform expansion is explained in DE-OS 43 40 291. The previously mentioned introduction of the compressed gas also comprises the introduction of compressed gas into the developing container bubble as well as the introduction of compressed gas into the preform at the beginning of the blow-molding process.

The basic design of a blow-molding station for molding containers is described in DE-OS 42 12 583. Possible ways of tempering the preforms are explained in DE-OS 23 52 926.

Within the blow-molding machine, the preforms and the blown containers can be transported by means of various handling devices. The use of transport mandrels, onto which the preforms are set, is known. The preforms can also be handled by other types of carrying devices, however. The use of grippers to manipulate the preforms and the use of clamping mandrels, which can be inserted into the mouth of the preform to hold it, also number among the available designs.

A way of handling containers and preforms by the use of transfer wheels is described in, for example, DE-OS 199 06 438, according to which a transfer wheel is arranged between a blow-molding wheel and a discharge section, and another transfer wheel is arranged between the heating section and the blow-molding wheel.

The previously explained handling of the preforms takes place in a so-called two-stage process, in which the preforms are first produced by an injection-molding step and then stored temporarily. In the second stage, after a certain period of time, they are conditioned to the proper temperature and blow-molded into containers. A so-called single-stage process is also used, in which the preforms are produced by injection-molding, allowed to solidify sufficiently, suitably tempered, and then blow-molded immediately.

Various designs of the blow-molding stations are known. In the case of blow-molding stations which are arranged on rotating transport wheels, the mold carriers are often designed to open up like books. It is also possible, however, to use mold carriers which are guided in such a way that they can be shifted relative to each other or guided in some other way. In the case of stationary blow-molding stations, which are especially suitable for accepting multiple cavities for container molding, plates arranged parallel to each other are typically used as mold carriers.

The preforms can be handled either exclusively by grippers or by grippers in combination with other carrying or handling elements. For example, the preforms can be held by transport mandrels over a portion of their transport distance, after which they can be handled by grippers over at least one an additional portion of the transport distance. The grippers in use up to now, however, do not fulfill all of the requirements to be imposed on grippers to ensure the non-damaging and simultaneously reliable handling of the preforms.

The essential requirement is that the preforms must be handled reliably and without breakdowns at high transport rates per unit time. Advisably, the grippers should be able to handle both the preforms and the blow-molded bottles. In addition, mechanical damage to the preforms as a result of the handling by the grippers must be avoided or minimized.

Many different types of gripper-like holding devices are known. There are, for example, actively controlled grippers, in which the opening and closing movements are controlled by a mechanical cam control unit or by pneumatic or electrical actuating elements. There are also grippers in which the gripper arms are not actively controlled but rather in which the gripper arms are provided with slanted infeed surfaces, which, when the workpiece is pushed against them, cause the gripper arms to open. After the area of the workpiece to be gripped has been fully introduced, the grippers then snap back into place under the action of springs and thus hold the workpiece. In conjunction with the use of slanted guide surfaces, the workpiece can be removed again by the application of previously determined tensile forces.

Both the use of actively controlled grippers and the use of passively actuated grippers lead to advantages and disadvantages. Actively controlled grippers require suitable actuating elements, which take up space, lead to corresponding costs, and increase the amount of required maintenance work and servicing. Passively controlled grippers are usually very simple in design, but because of their direct contact with the workpieces, they lead to scratches or abrasion of the workpiece.

SUMMARY OF THE INVENTION

The goal of the present invention is to improve a method of the type described above in such a way that reliable, non-damaging transport of the workpieces at high transport speeds is facilitated.

This goal is achieved according to the invention in that the pivoting movement of the gripper arm is controlled by at least one magnet.

An additional goal of the present invention is to design an apparatus of the type described above in such a way that a simple mechanical design is achieved while at the same time non-damaging transport of the workpieces is ensured.

This goal is achieved according to the invention in that a positioning device for the gripper arm comprises at least one magnet, the distance of which from a counterelement can be varied.

Through the use of magnets, advantage can be taken of magnetic forces of attraction or repulsion, which act without contact. If, for example, the gripper arm is connected to an actuating element on which a permanent magnet is arranged so that its magnetic north pole points in a contact direction, this permanent magnet will be subjected to a compressive force when approached by another permanent magnet, the magnetic north pole of which points toward the first magnet. In the presence of a suitable mechanical arrangement, this compressive force leads either to an opening movement or to a closing movement of the gripper. Conversely, upon the approach of a second magnet the south pole of which points toward the first magnet, a tensile force will act on the first magnet, advantage of which can also be taken to execute an opening or a closing movement of the gripper.

In general, it is necessary to use two magnets to generate appropriate compressive forces, these magnets being arranged with the same magnetic poles facing each other. If it is desired to generate tensile forces, however, it is sufficient to use only one magnet. This magnet can cooperate with a ferromagnetic material such as iron. The use of two magnets to generate tensile forces, however, leads to a stronger effective force, and thus an apparatus of more compact design can be obtained without a loss of actuating force.

The handling of preforms by the use of gripper arms as described above and in the following pertains equally to the handling of blow-molded containers, although this will not be pointed out separately each time. Spring-loading the gripper arms relative to a central element or relative to each other facilitates the automatic holding of the preforms or bottles without the need for separate interlocking elements or actively controlled actuating elements. It is also conceivable that, rather than directly, the gripper arms could act indirectly on the preforms or bottles by way of carrier elements, which themselves hold the preforms or bottles. The availability of a large amount of force can be facilitated by the cooperation of at least two magnets.

The gripper can be controlled as a function of the stage of the transfer process by moving the magnet and a counterelement relative to each other to vary the distance between them.

The transfer of a large number of workpieces per unit time can be facilitated by using a transfer arm of a rotating transport wheel to position the gripper carrier.

To generate compressive forces, it is provided that the magnet and a counterelement designed as a magnet are positioned with the same magnetic poles pointing toward each other during the performance of a gripper actuation.

The generation of tensile forces is made possible in that the magnet and a counterelement designed as a magnet are positioned with the opposite magnetic poles facing each other during the performance of a gripper actuation.

Wear-free operation is achieved in that the magnet and the counterelement are conducted past each other without contact.

To increase the operational reliability, it is proposed that the gripper arm be connected to an additional mechanical actuating device.

It is also conceivable that the gripper carrier could be arranged in the area of a container-filling machine.

DETAILED DESCRIPTION OF THE INVENTION

The inventive handling of workpieces is explained below on the basis of the example of a blow-molding machine.

Figure 1:
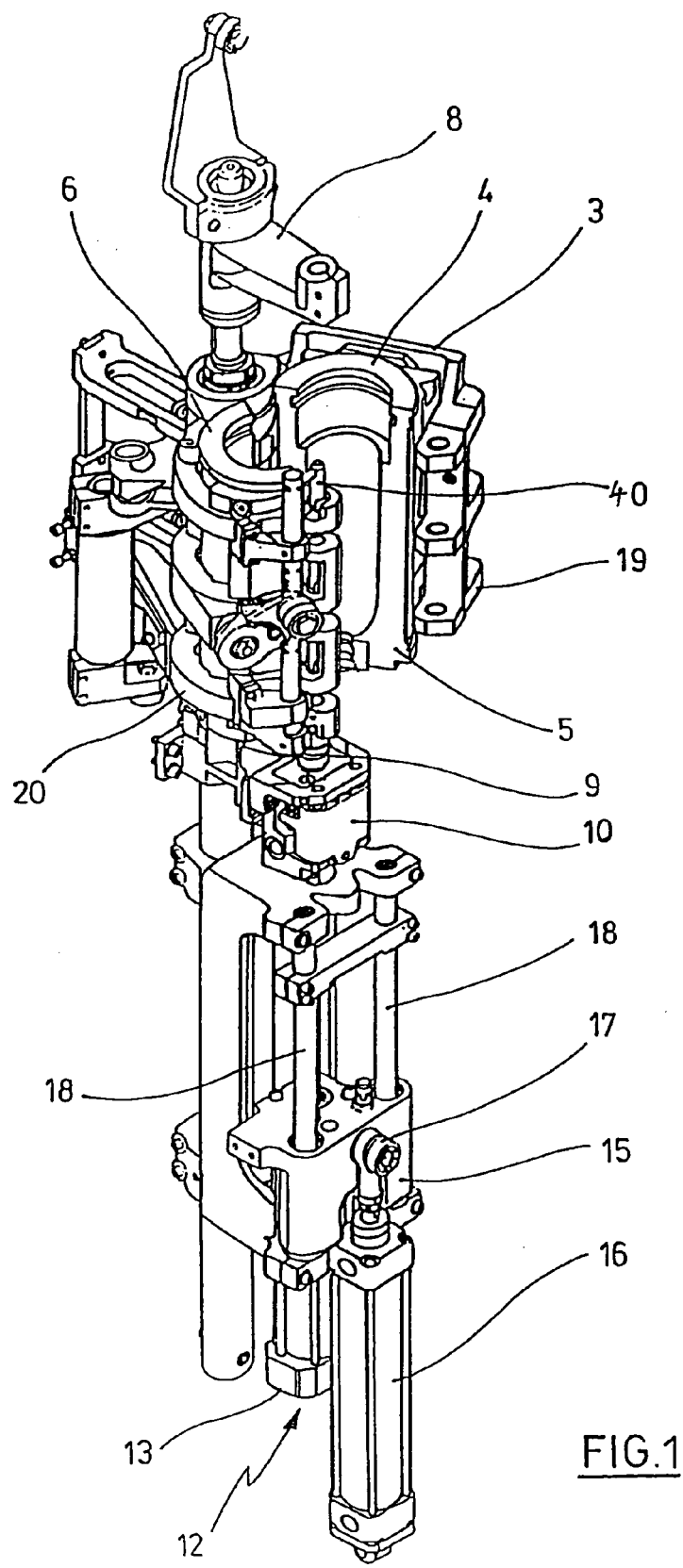
FIG. 1 shows a perspective view of a blow-molding station for the production of containers from preforms.
Figure 2:
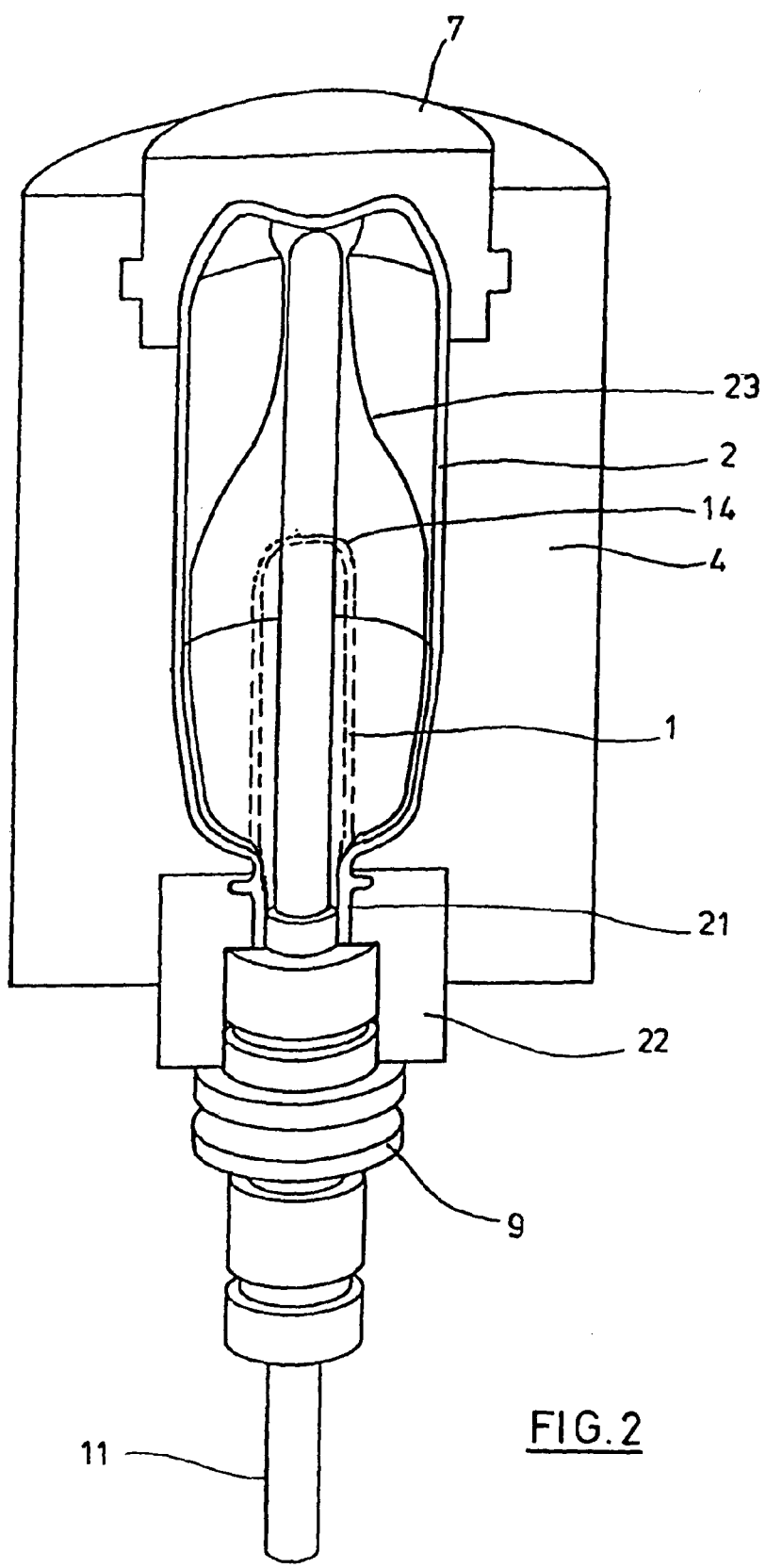
FIG. 2 shows a longitudinal cross section through a blow-mold, in which a preform is stretched and expanded.

The basic design of an apparatus for molding preforms 1 into containers 2 is illustrated in FIGS. 1 and 2. The arrangement can be the same as that shown, or it can be carried out after rotation by 180° in a vertical plane.

The apparatus for molding the container 2 consists essentially of a blow-molding station 3, which is equipped with a blow-mold 4, into which a preform 1 can be introduced. The preform 1 can be an injection-molded part of polyethylene terephthalate. So that the preform 1 can be introduced into the blow-mold 4 and so that the finished container 2 can be removed from it, the blow-mold 4 consists of mold halves 5, 6 and a bottom part 7, which can be positioned by a lifting device 8. The preform 1 can be held in place in the area of the blow-molding station 3 by a holding element 9. It is possible, for example, to introduce the preform 1 directly into the blow-mold 4 by means of grippers or other means of manipulation.

So that compressed air can be introduced, a connecting piston 10 is arranged underneath the blow-mold 4; this piston supplies compressed air to the preform 1 and simultaneously provides a good seal. In a modified design, it is also possible, however, to use fixed compressed air feed lines.

In this exemplary embodiment, a stretching rod 11, which is positioned by a cylinder 12, is used to stretch the preform 1. According to another embodiment, the mechanical positioning of the stretching rod 11 is achieved by the use of cam segments, which are actuated by pickup rollers. The use of cam segments is especially advisable when a plurality of blow-molding stations 3 is mounted on a rotating blow-molding wheel 25.

In the case of the embodiment shown in FIG. 1, the stretching system is designed with a tandem arrangement 12 of two cylinders. Before the start of the actual stretching operation, a primary cylinder 13 moves the stretching rod 11 into the area of the bottom 14 of the preform 1. For the actual stretching operation, a secondary cylinder 16 or a cam control unit positions the primary cylinder 13, which carries the extended stretching rod, jointly with a slide 15, which carries the primary cylinder 13. In particular, a cam can be used to control the secondary cylinder 16 in such a way that a guide roller 17, which slides along the control surface of the cam during the performance of the stretching operation, defines the stretching position at the time in question. The secondary cylinder 16 presses the guide roller 17 against the control surface of the cam. The slide 15 slides along the two guide elements 18.

After the mold halves 5, 6, which are arranged in the area of carriers 19, 20, have been closed, the carriers 19, 20 are locked together by a locking device 20.

So that the apparatus can be adapted to differently shaped mouth sections 21 of the preform 1, separate threaded inserts 22 can be used in the area of the blow-mold 4 as shown in FIG. 2.

FIG. 2 shows not only the blow-molded container 2 but also the preform 1, shown in broken line, and in schematic fashion the developing container bubble 23.

Figure 3:
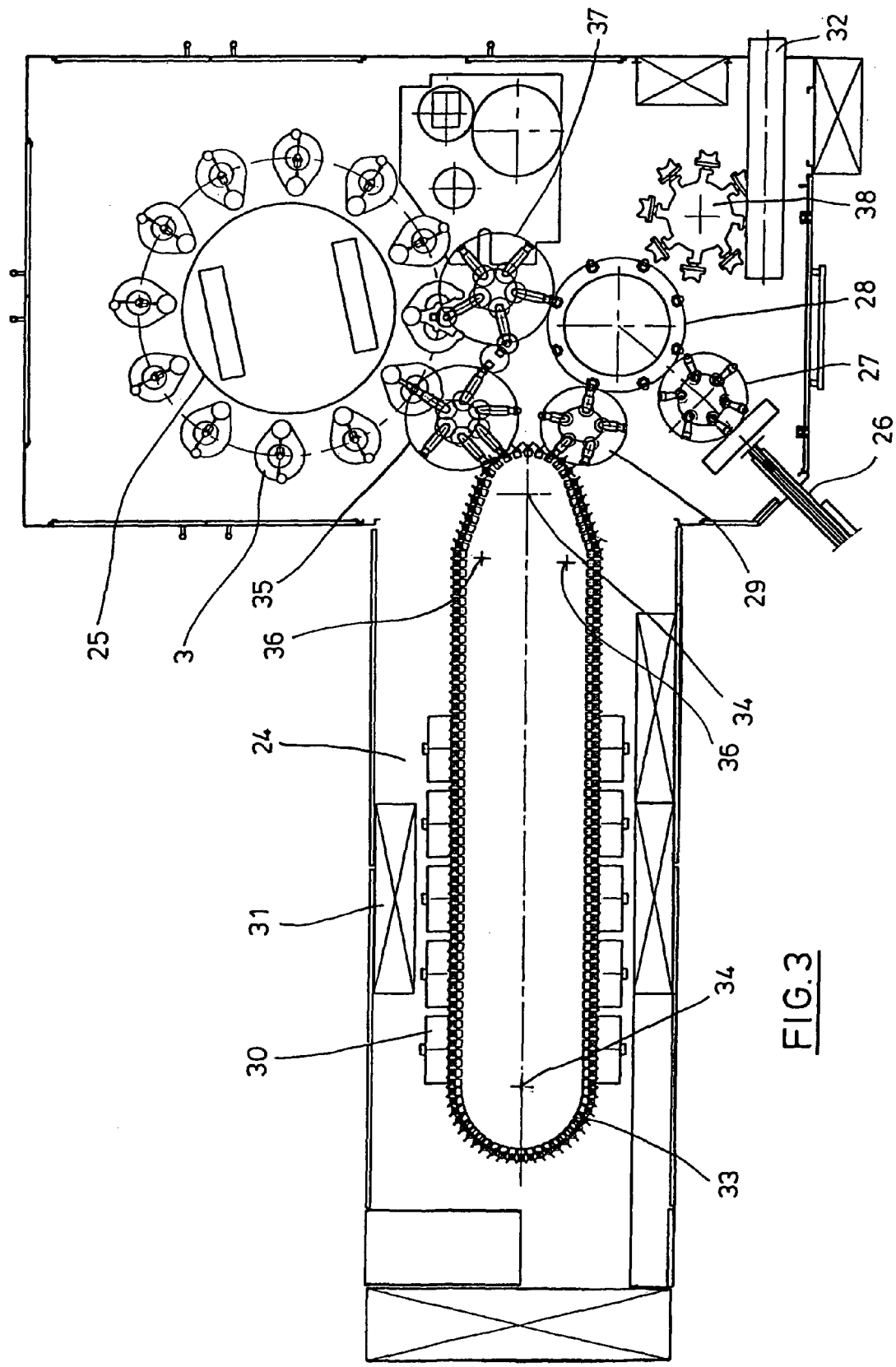
FIG. 3 shows a sketch which illustrates a basic design of an apparatus for the blow-molding of containers.

FIG. 3 shows the basic design of a blow-molding machine equipped with a heating section 24 and a rotating blow-molding wheel 25. Starting from a preform feed unit 26, the preforms 1 are transported into the area of the heating section 24 by transfer wheels 27, 28, 29. Heat radiators 30 and blowers 31 are installed along the length of the heating section 24 to temper the preforms 1. After the preforms 1 have been tempered sufficiently, they are transferred to the blow-molding wheel 25, in the area of which the blow-molding stations 3 are mounted. The finished blow-molded containers 2 are sent by transfer wheels 37, 28, 38 to a discharge section 32.

So that a preform 1 can be molded into a container in such a way that the container 2 comprises material properties which guarantee a long shelf life for the food product, especially a beverage, packaged inside the container 2, special processing steps must be carried out during the heating and orientation of the preforms 1. In addition, advantageous effects can also be achieved by following special dimensioning guidelines.

Various plastics can be used as the thermoplastic material. PET, PEN, and PP, for example, are suitable.

The preform 1 is expanded during the orientation step by the infeed of compressed air. The compressed air feed process is divided into a pre-blowing phase, in which gas, such as compressed air, is supplied at low pressure, and a following main blowing phase, in which gas is supplied at a higher pressure. During the pre-blowing phase, compressed air is used typically at a pressure in the range of 10-25 bars, and during the main blowing phase, compressed air is supplied at a pressure in the range of 25-40 bars.

It can also be seen from FIG. 3 that, in the case of the embodiment shown here, the heating section 24 is formed by a plurality of endlessly traveling transport elements 33, which are arranged in a chain-like row and guided around deflecting pulleys 34. In particular, the chain-like arrangement can be set up to define an essentially rectangular outline. In the present embodiment, a single, relatively large deflecting pulley 34 is used in the area of the part of the heating section 24 facing the transfer wheel 27, whereas, in the area where the two adjacent deflections occur, two comparatively smaller deflecting pulleys 36 are used. In principle, however, any other desired type of guide configuration can be used.

So that the transfer wheel 27 and the blow-molding wheel 25 can be arranged as closely together as possible, the illustrated arrangement proves to be especially effective, because here the three pulleys 34, 36 are positioned in the relevant area of the heating section 24; that is, the two smaller pulleys 36 are located in the area of the transition to the linear portion of the heating section 24 and the larger pulley 34 directly in the area of the transfer to the transfer wheel 27 and to the blow-molding wheel 25. As an alternative to the use of chain-like transport elements 33, it is also possible to use, for example, a rotating heating wheel.

After the blow-molding of the containers 2 is finished, the containers are removed by the transfer wheel 38 from the area of the blow-molding stations 3 and transported to the discharge section 32.

Figure 4:
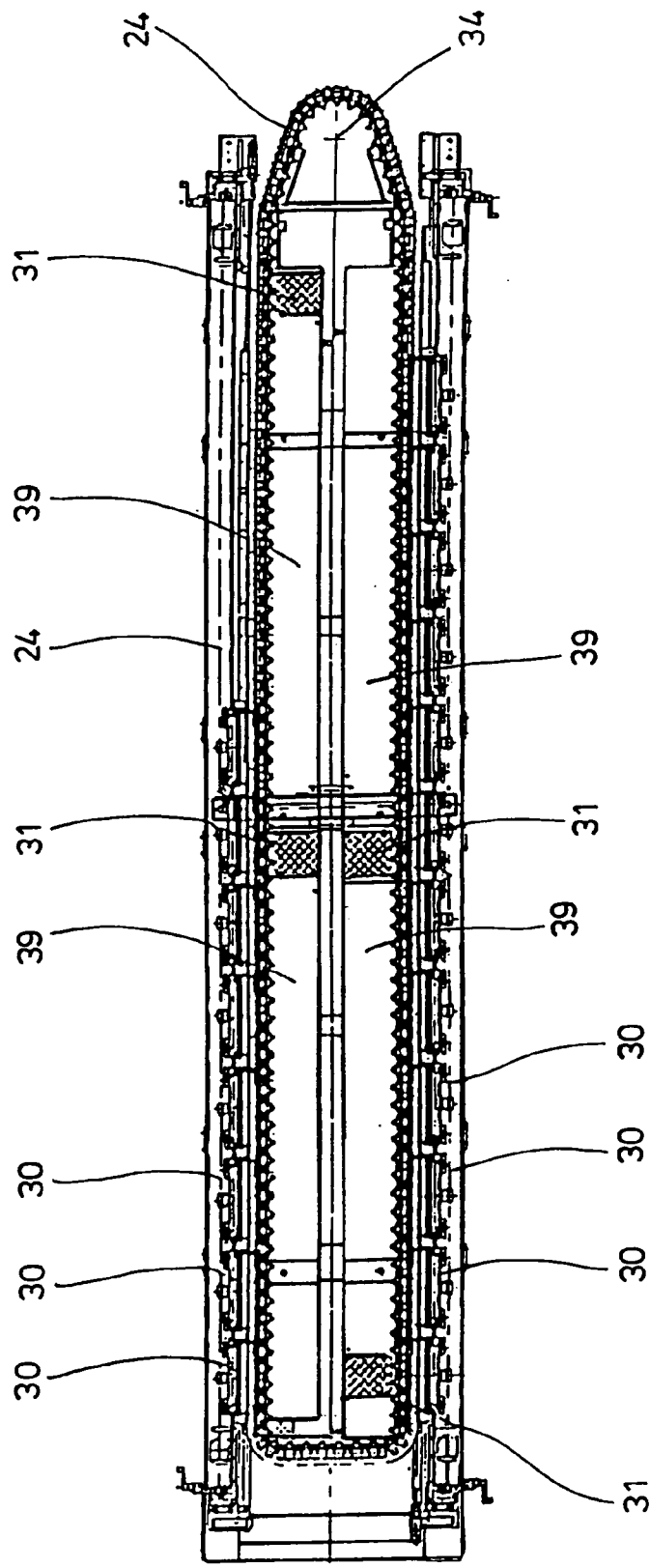
FIG. 4 shows a modified heating section with increased heating capacity.

In the modified heating section 24 shown in FIG. 4, the larger number of heat radiators 30 makes it possible to temper a larger number of preforms 1 per unit time. The blowers 31 conduct cooling air into the area of cooling air channels 39, which are arranged opposite their assigned heat radiators 30 and release the cooling air through outlets. Because of the way in which the outflow directions are oriented, the cooling air flows in a direction which is essentially transverse to the transport direction of the preforms 1. The surfaces of the cooling air channels 39 opposite the heat radiators 30 can be provided with reflectors for the heat radiation; it is also possible for the discharged cooling air to cool the heat radiators 30.

The preforms 1 and the containers 2 can be transported through the blow-molding machine in various ways. According to one design variant, the preforms are carried along over at least a large portion of their transport distance by transport mandrels. It is also possible, however, for the preforms to be transported by grippers, which grip the external surface of the preform, or by internal mandrels, which are introduced into the mouths of the preforms. There are also various ways in which the preforms can be oriented in space.

According to one variant, the preform is supplies in the area of the preform feed unit 26 with its mouth pointing vertically upward; it is then rotated and conveyed along the heating section 24 and around the blow-molding wheel 25 with its mouth pointing vertically downward; and finally it is rotated again before it reaches the discharge section 32. According to another variant, the preform 2 is heated in the area of the heating section 24 with its mouth pointing vertically downward but rotated again by 180° before it reaches the blow-molding wheel 25.

According to a third design variant, the preform travels through the entire blow-molding machine without ever being rotated, i.e., with its mouth pointing vertically upward at all times.

Figure 5:
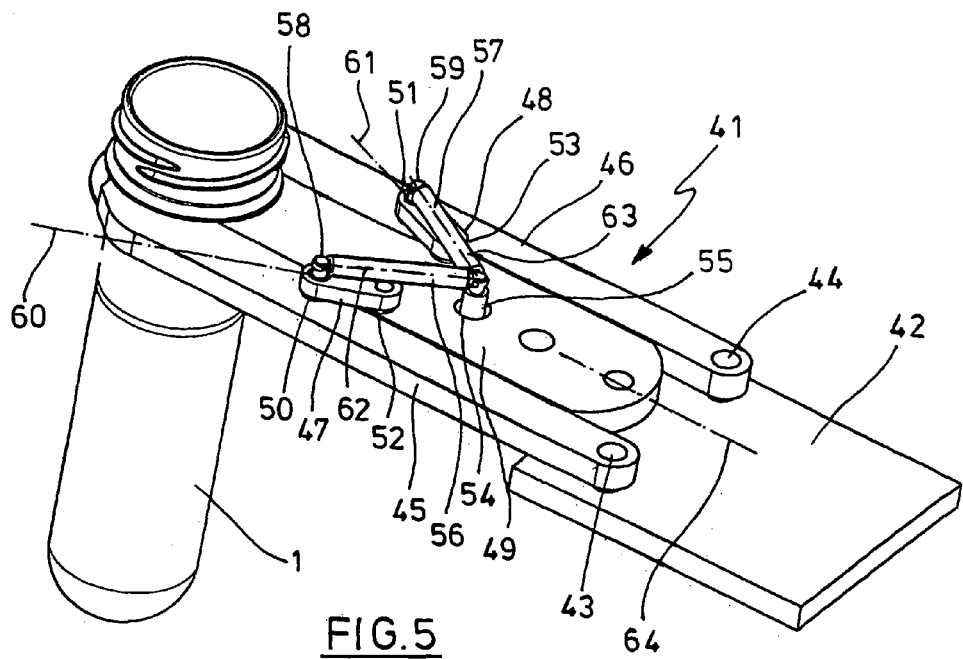
FIG. 5 shows a perspective diagram of a transport element with two gripper arms and a central element in the closed state of the grippers.

FIG. 5 shows a perspective view of a preform 1 being held by a gripper-like transport element 41. The transport element 41 can also position a blown container 2 in a similar manner. The transport element 41 comprises a gripper carrier 42, which is connected to the gripper arms 45, 46 by pivot joints 43, 44. The gripper arms 45, 46 are connected to a central element 49 by levers 47, 48. The levers 47, 48 are connected to the gripper arms 45, 46 by pivot joints 50, 51 and to the central element 49 by pivot joints 52, 53. The central element 49 comprises an opening 54, into which a retaining element 55 connected to the gripper carrier 42 is inserted. According to an alternative embodiment, the retaining element 55 can also be formed as an integral part of the central element 49.

At least one of the pivot joints 43, 44, 50, 51, 52, 53 can be realized as a pin-in-hole combination, as a hinge, as a film joint, or as a solid joint. When film joints or solid joints are used, it is possible for all of the components of the transport element 41 except for the springs 56, 57 to be designed as an integral one-piece unit or for some of the components to be combined into one or more modules.

The gripper arms 45, 46 are also connected to the retaining element 55 by springs 56, 67. The springs 56, 57 are preferably designed as tension springs and are held by pins 58, 59 at the ends facing away from the retaining element 55, the pins being formed as extensions of the pivot joints 50, 51.

FIG. 5 shows the transport element 41 in the closed state, in which the preform 1 is held by the gripper arms 45, 46. The springs 55, 57 and the central element 49 stabilize the gripper arms 45, 46 in the closed position shown. It can be seen in particular that both the longitudinal axes 60, 61 of the levers 47, 48 and the longitudinal axes 62, 63 of the springs 56, 57 are arranged at an angle to the central longitudinal axis 64 of the central element 49. With respect to the central longitudinal axis 64, the longitudinal lever axes 60, 61 and the longitudinal spring axes 62, 63 extend forward toward the preform 1 at an angle.

In the embodiment shown in FIG. 5, the central longitudinal axis 64 represents the axis of symmetry of the transport element 41. The central element 49 is located between the gripper arms 45, 46; and, in the closed position shown, the gripper arms 45, 46 rest laterally against the central element 49.

Figure 6:
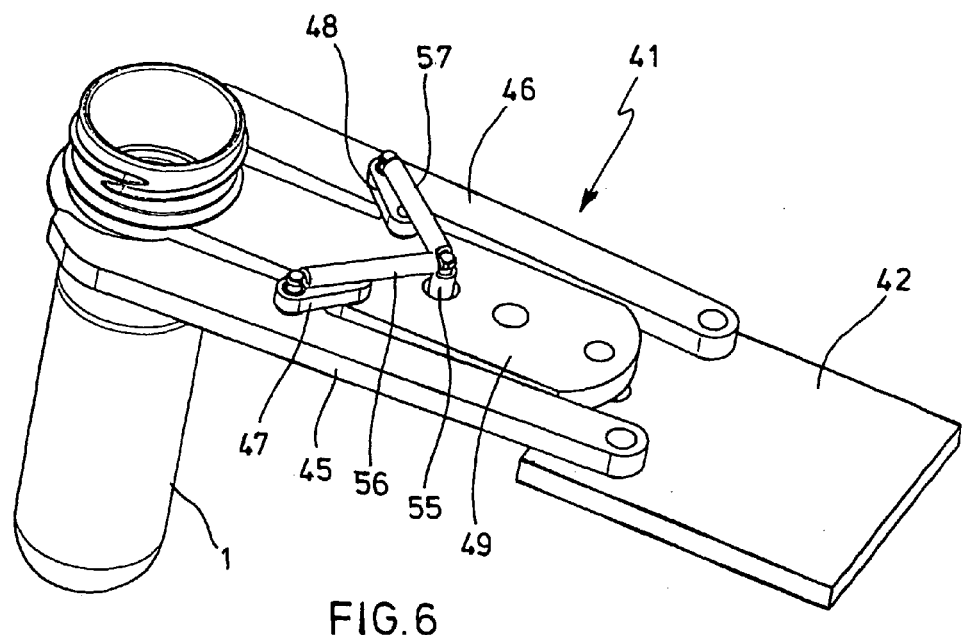
FIG. 6 shows the arrangement according to FIG. 5 after the grippers have been opened.

FIG. 6 shows the same arrangement as that of FIG. 5 except that now the gripper arms 45, 46 have been opened. According to the exemplary embodiment shown here, the retaining element 55 is rigidly connected to the central element 49 and is shifted jointly with the central element 49 relative to the gripper carrier 45. As a result of the positioning movement of the central element 49, the levers 47, 48 and thus also the gripper arms 45, 46 are pivoted and release the preform 1.

Figure 7:
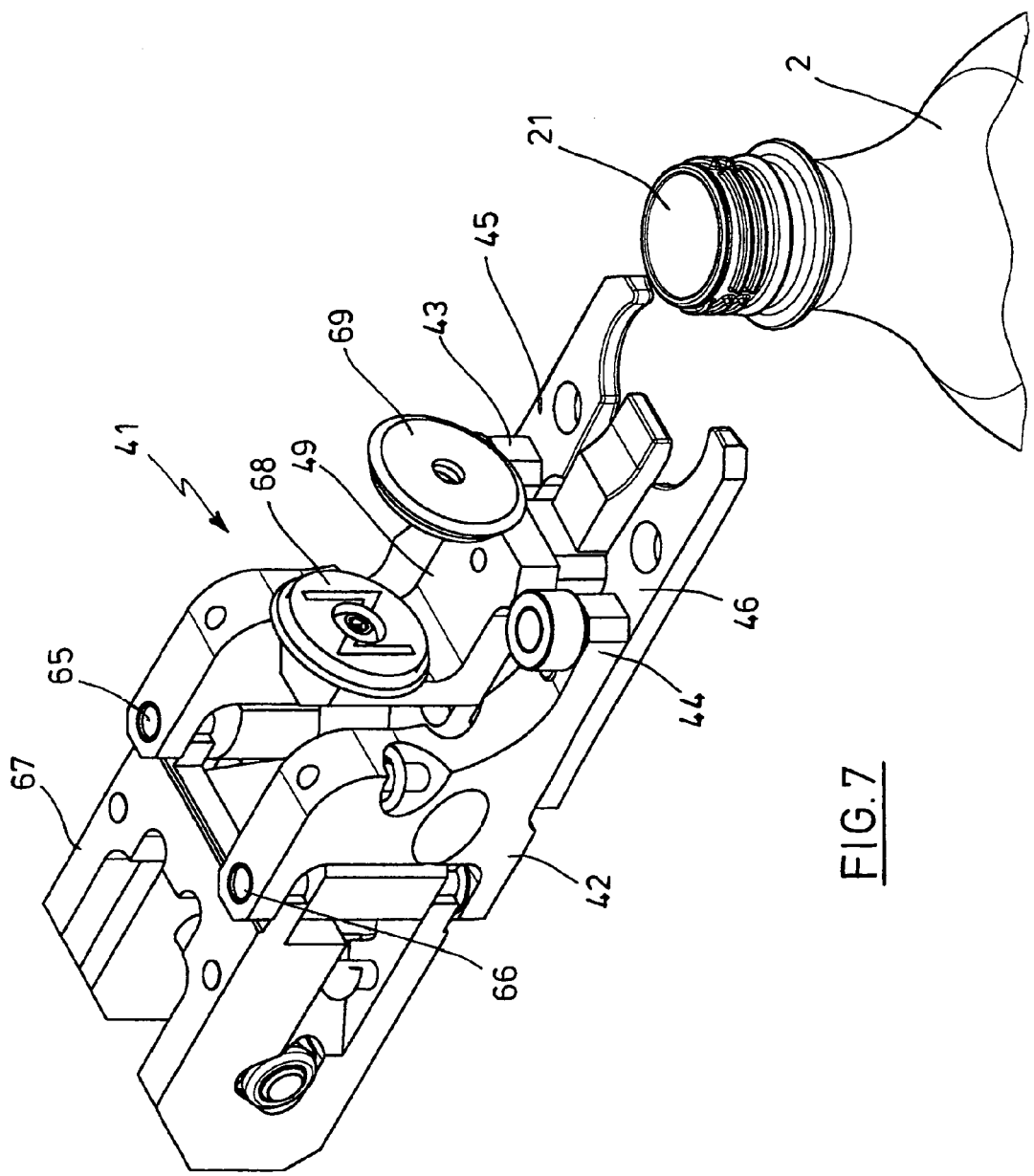
FIG. 7 shows a schematic diagram of an opened gripper, which comprises a permanent magnet in the area of an actuating element, and of an associated positionable countermagnet.

FIG. 7 shows a detailed design embodiment of a transport element 41. The gripper carrier 42 is for its own part connected to an element base 67 so that it can be deflected. This arrangement makes it possible for the carrier to get out of the way in the event of a collision. In the area of the central element 49, a magnet designed as a permanent magnet 68 is arranged. The permanent magnet 68 in the exemplary embodiment shown here is arranged with its magnetic north pole pointing away from the element base 67. A countermagnet 69, which can also be designed as a permanent magnet, is arranged a certain distance away from the permanent magnet 68. In the example shown, the countermagnet 69 is arranged with its magnetic north pole pointing toward the permanent magnet 68.

When the countermagnet 69 approaches the permanent magnet 68, a compressive force is exerted on the permanent magnet 68, which transmits it to the central element 69. This actuating force causes the gripper arms 45, 46 to close.

Figure 8:
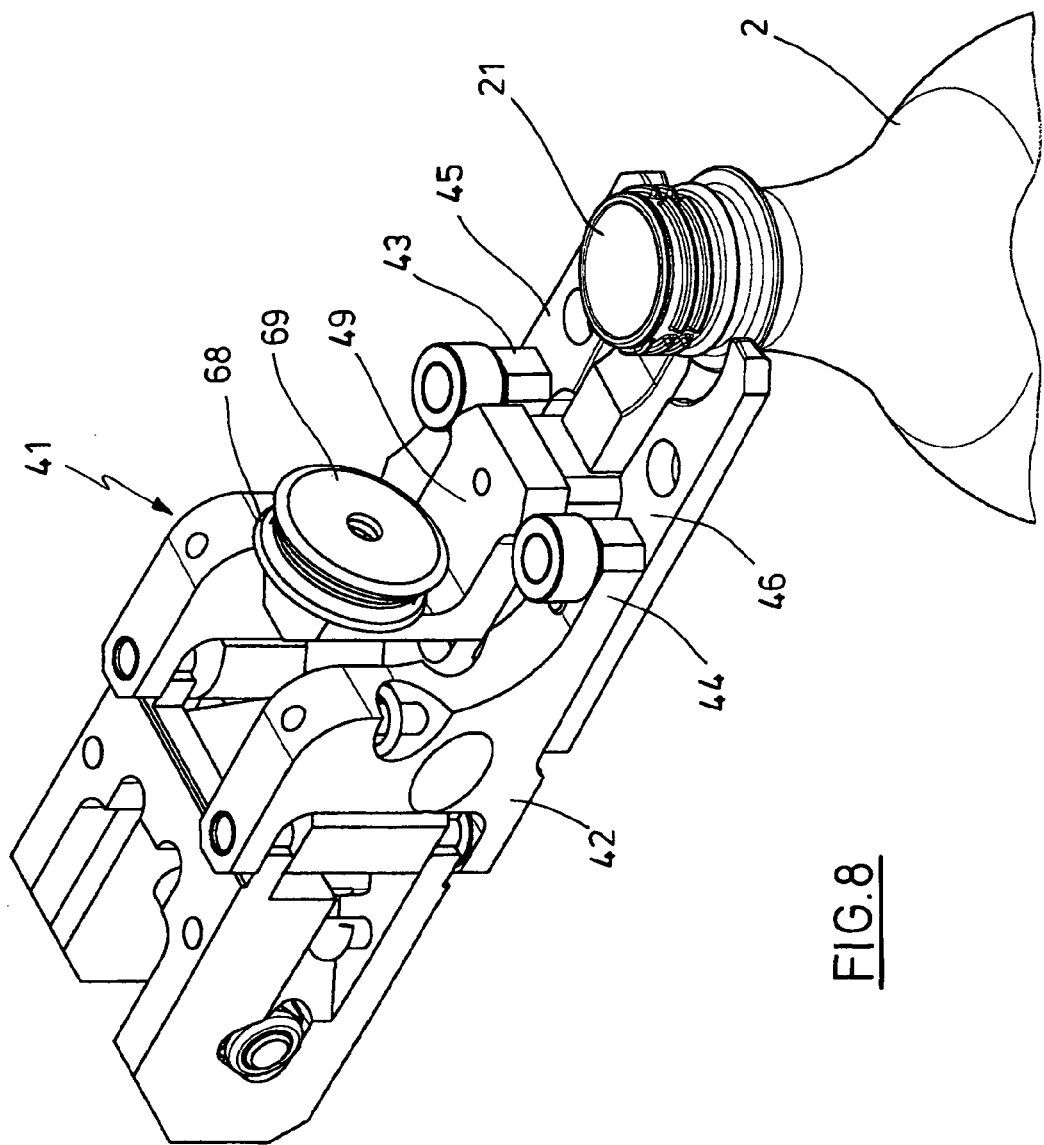
FIG. 8 shows the arrangement according to FIG. 7 after the movable magnet has approached the magnet located in the area of the gripper.

FIG. 8 shows an operating state in which the countermagnet 69 has been moved up to within a very short distance of the permanent magnet 68 and is thus much closer to it than it was in the arrangement of FIG. 7. The mouth section 21 of the container 2 has already been introduced almost completely into the receiving area of the gripper arms 45, 46, and the gripper arms 45, 46 are ready to begin their closing movement.

Figure 9:
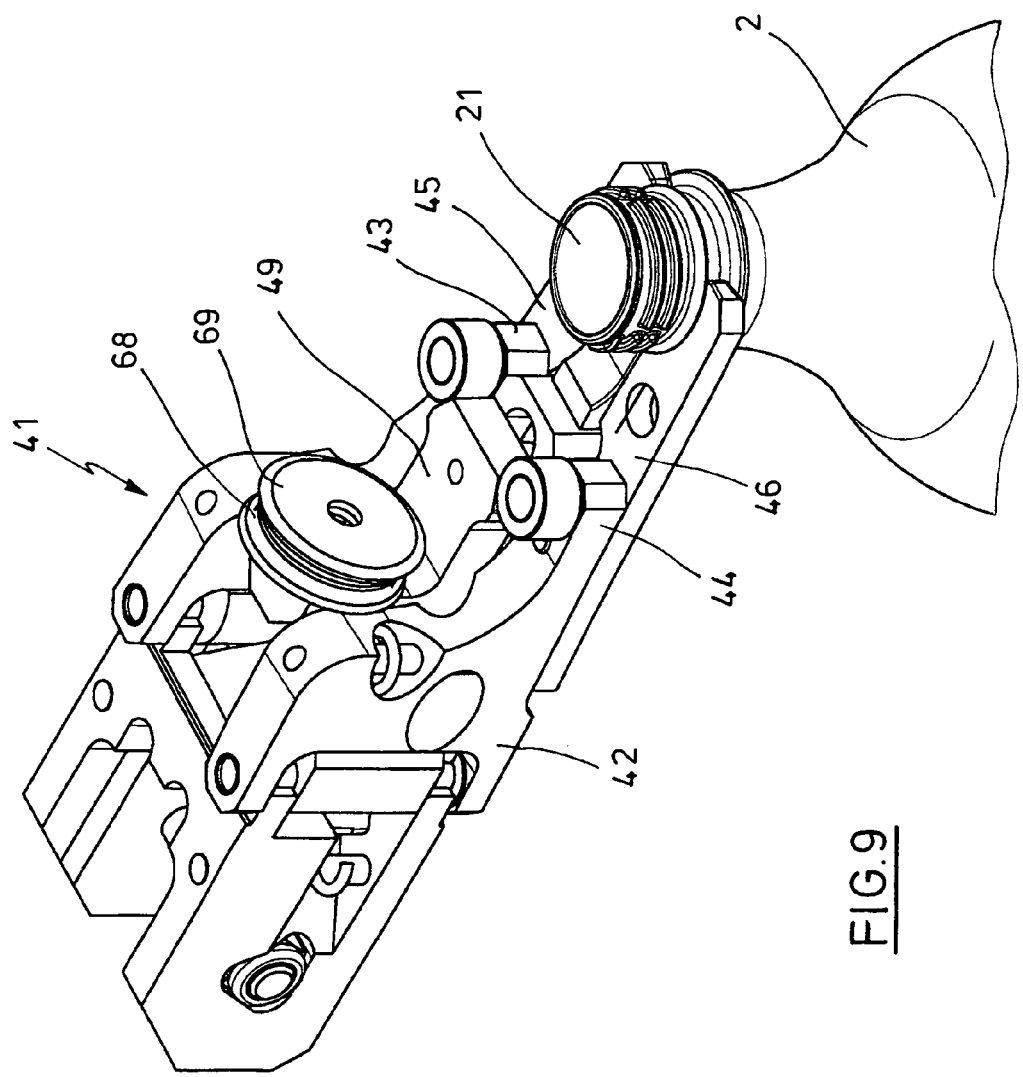
FIG. 9 shows the arrangement according to FIGS. 7 and 8 after completion of the closing movement of the gripper.

FIG. 9 shows the transport element 41 after the completed closing of the gripper arms 45, 46. The mouth section 21 of the container 2 is held firmly in place by the gripper arms 45, 46 in a position above, for example, a support ring.

According to a typical embodiment, the gripper carriers 42, i.e., their element bases 67, are mounted on a rotating transfer wheel. The containers 2 or the preforms 1 or, in general, the workpieces are also conveyed to or away from the area of the transport elements 41 by rotating transport elements or elements which move in some other way. The countermagnets 69 are therefore advisably arranged in the area of one of these transport devices for the workpieces.

The embodiment explained above ensures that the permanent magnet 68 occupies a defined, constant position relative to the gripper carrier 42 and also that the countermagnet 69 occupies a defined, constant position relative to the workpiece to be transferred. The threading-in or threading-out of the part of the workpiece to be gripped between the gripper arms 45, 46 can thus be coordinated precisely with the movement by which the countermagnet 69 approaches the permanent magnet 68 or moves away from it, so that the movements in question can be executed precisely in relation to each other.

According to another embodiment, it is proposed in particular that the permanent magnets 68 and the countermagnets 69 do not touch each other at any time during the course of the process. This makes it possible to achieve an especially high resistance to wear.

According to another embodiment, it is provided that contact between the permanent magnets 68 and the countermagnets 69 is allowed, but that, because of the forces of magnetic repulsion which are in play, the magnets exert only a small amount of force on each other. As a supplement to the idea just explained above, the permanent magnets 68 and/or the countermagnets 69 can be provided with thin coatings such as coatings of plastic to prevent damage in the even that they come into contact with each other.

According to another embodiment, it is proposed that, adjacent to the permanent magnet 68 and/or adjacent to the countermagnet 69, mechanical guide elements be provided, which, in cases where the magnets do not exert enough force, forcibly open or close the gripper arms 45, 46, so that, in the event of a possible functional breakdown, the transfer processes can nevertheless be completed reliably.

As an alternative or supplement to the above, it is also proposed that, in cases where the magnets do not exert sufficient force, the opening and/or closing movements of the gripper arms 45, 46 be brought about directly by the workpiece to be transferred, so that the transfer processes can be carried out reliably even when problems occur.

In the case of the stationary magnets, it is possible in all of the embodiments to replace the permanent magnets or to supplement them with electromagnets or electrically actuated magnet systems.

The invention claimed is:

1. A method for transferring workpieces, comprising the steps of: handling the workpiece by a holding device comprising at least one gripper arm mounted with freedom to pivot relative to a gripper carrier; the gripper arm being pivoted to execute gripping and release movements; controlling pivoting movement of the gripper arm by at least one permanent magnet; and connecting the gripper arm to an additional mechanical actuating device.

2. The method according to claim 1, wherein at least two magnets work together to control the pivoting movement.

3. The method according to claim 1, including moving the magnet and a countermagnet relative to each other to change a distance between them.

4. The method according to claim 1, including positioning the gripper carrier by a transfer arm of a rotating transport wheel.

5. The method according to claim 1, including positioning the magnet and a counterelement designed as a magnet so that common same magnetic poles face each other during execution of a gripper actuation.

6. The method according to claim 1, wherein the magnet and a counterelement designed as a magnet are positioned with the opposite poles facing each other during the execution of a gripper actuation.

7. The method according to claim 3, including moving the magnet and the counterelement past each other without contact.

8. The method according to claim 1, including arranging the gripper carrier in an area of a blow-molding machine.

9. The method according to claim 1, including arranging the gripper carrier in an area of a container-filling machine.

10. An apparatus for transferring workpieces, comprising: at least one holding device for handling a workpiece, wherein the holding device includes at least one gripper arm mounted with freedom to pivot relative to a gripper carrier, the gripper arm having a first pivoted position for holding the workpiece and a second pivoted position for releasing the workpiece; and a positioning device for the gripper arm, the positioning device including at least one permanent magnet, which is movable relative to a counterelement to change a distance between the magnet and the counterelement, wherein the gripper arm is connected to an additional mechanical activating device.

11. The apparatus according to claim 10, wherein the positioning device includes at least two magnets.

12. The apparatus according to claim 10, wherein the gripper carrier is held by a transfer arm of a rotating transport wheel.

13. The apparatus according to claim 10, wherein the magnet and the counterelement designed as a magnet are arranged so that common magnetic poles face each other during a gripper actuation.

14. The apparatus according to claim 10, wherein the magnet and the counterelement designed as a magnet are arranged so that opposite magnetic poles face each other during a gripper actuation.

15. The apparatus according to claim 10, wherein the positioning device includes an additional mechanical guide.

16. The apparatus according to claim 10, wherein the gripper carrier is part of a blow-molding machine.

17. The apparatus according to claim 10, wherein the gripper carrier is part of a container-filling machine.

* * * * *

UNITED STATES PATENT AND TRADEMARK OFFICE
CERTIFICATE OF CORRECTION

PATENT NO.         : 8,590,693 B2                                    Page 1 of 1
APPLICATION NO.    : 13/139490
DATED              : November 26, 2013
INVENTOR(S)        : Linke et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 71 days.

Signed and Sealed this
Twenty-second Day of September, 2015

Michelle K. Lee
*Director of the United States Patent and Trademark Office*